3,004,914
CATALYSTS AND HYDROGENATION PROCESSES USING THE CATALYST

Peter Thomas White, Sunbury-on-Thames, England, assignor to The British Petroleum Company Limited, London, England, a British joint-stock corporation
No Drawing. Filed July 20, 1959, Ser. No. 828,067
Claims priority, application Great Britain July 25, 1958
11 Claims. (Cl. 208—255)

This invention relates to new nickel catalysts and to hydrogenation processes using the catalysts.

Commonly, nickel catalysts consists of nickel salts or oxide on a support such as alumina. Such catalysts require activation and the activation of the catalyst is carried out by reducing the salt or oxide to the metal. With a salt such as the nitrate, this is normally a calcination at about 550° C. to convert the nitrate to nickel oxide followed by reduction in a stream of hydrogen or hydrogen-containing gas at a temperature of 150° to 600° C.

The present invention is concerned with a new support for nickel catalysts and according to one aspect of the invention, a catalyst comprises nickel or a nickel compound, for example a salt or oxide, supported on a base which consists essentially of sepiolite. As with other nickel catalysts, activation is required before use and it is to be understood that the present invention includes the catalyst in either its inactive or its active form.

Sepiolite is a commercially available clay mineral, which occurs naturally and which can also be prepared synthetically. It has the ideal formula

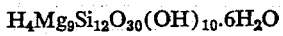
$$H_4Mg_9Si_{12}O_{30}(OH)_{10} \cdot 6H_2O$$

and is also known as Meerschaum. Further information on sepiolite and its properties may be found in "Chemistry and Industry" of November 16, 1957, at pages 1492 to 1495.

The preparation of the catalyst and its activation may be carried out in any convenient manner, the following three methods being merely illustrative.

(a) The catalyst may be prepared on the base by an impregnation technique by dissolving in water a nickel salt, for example nickel nitrate, and impregnating the sepiolite with it. The sepiolite may be conveniently in the form of granules, or pellets of any desired size formed from ground sepiolite. After impregnation, the catalyst is dried and is then in a form in which it can be stored if desired for long periods without deterioration. In order to use the catalyst, it must be activated by heating to decompose the salt; in the case of the nitrate this requires a temperature of about 550° C., and the nickel will be converted to the oxide. Final activation by reduction to metallic nickel can be carried out in a stream of hydrogen or hydrogen-containing gas at a temperature of 150° to 600° C. Sepiolite possesses an advantage over some commonly used bases—e.g. alumina, in that there is no reaction of the nickel salt with sepiolite during the heating of the catalyst to reduce the nickel nitrate to oxide, and the final reduction can be carried out at a lower temperature than that necessary for nickel-alumina catalysts. No damage results to the sepiolite however, if it is heated at a temperature above 600° C.

(b) The catalyst may be prepared by milling dry nickel formate with powdered sepiolite, and the mixture subsequently pelleted. The advantage of this method of preparation is that a salt such as nickel formate reduces directly to nickel (without going through the oxide state) in a non-oxidising atmosphere, for example in an inert gas stream at a temperature of 150° to 300° C., preferably about 250° C. This method has the advantage that it is not necessary to heat large quantities of catalysts to temperatures of 500° C. and higher.

(c) The catalyst may be prepared by a technique which utilises the water soluble complex nickel ammine formate $Ni(NH_3)_6(HCOO)_2$, which is formed when nickel formate dissolves in ammonia, this complex breaks down on heating to give nickel formate again. By using this water-soluble complex catalysts may be prepared by the impregnation technique from normally water insoluble compounds such as nickel formate. To prepare a catalyst by this method nickel formate is dissolved in ammonia solution, and the solution used for the impregnation of sepiolite granules or pellets. The catalyst is then dried, and activation is carried out by the method described under (b).

In all the preparations, it may be desirable to calcine the sepiolite prior to incorporating the nickel compound. A convenient calcination temperature is about 550° C.

After the reduction, the nickel catalyst should not be allowed to come into contact with air or spontaneous oxidation of the nickel to nickel oxide may occur.

Preferably the catalyst contains from 1 to 50% of nickel (expressed as elemental nickel) by weight of total catalyst, and more particularly from 5 to 15% wt.

The new catalyst described above may be used in a process which also constitutes part of the invention, namely a process for the hydrogenation of organic compounds which comprises contacting the compound or compounds, together with hydrogen, with a catalyst comprising nickel supported on a base as hereinbefore described, under conditions of temperature and pressure which favour hydrogenation.

The process of this invention is suitable for use in the treatment of an organic compound containing a carbon to carbon double bond in the molecule for the saturation of this bond. The process may also be employed for the treatment of an organic compound containing a carbon to carbon triple bond in the molecule for the conversion of this bond to a carbon to carbon double bond or for the saturation of the bond. Also the process may be employed for the conversion of aromatic compounds to naphthenic compounds. Preferred feedstocks are hydrocarbon, or petroleum fractions, or materials consisting largely of hydrocarbon produced from petroleum by any process or treatment.

The process is of particular value for the conversion of di-olefinic compounds to mono-olefinic compounds. It has been found that under suitable reaction conditions, di-olefinic compounds may be converted to mono-olefinic compounds with only low conversion of these or other mono-olefinic compounds to saturated compounds.

The catalyst is particularly suitable for the partial hydrogenation of steam cracker gasoline, which is herein defined as a gasoline produced by cracking a petroleum distillate in the presence of steam. Such cracked gasoline is highly unsaturated and tends to form gum possible due to the presence of styrene, cyclopentadiene and other conjugated dienes.

A particularly suitable process in which the catalyst may be used is a method for improving a gasoline containing di-olefins and/or styrenes and also in certain cases cyclenes and alkenes, for example a steam cracker gasoline. The gasoline is passed with hydrogen, or a gas mixture containing hydrogen, over a catalyst consisting of nickel deposited on a catalyst base, as hereinbefore described, under conditions such that a substantial proportion of any di-olefins or styrenes which are present are hydrogenated to mono-olefins and saturated side chain aromatics respectively. Suitable gas mixtures are mixtures of hydrogen with normally gaseous hydrocarbons, for example a platformer tail gas. Suitably a gas is employed containing 70 mol percent of hydrogen. A typical gas will consist of 70 mol percent of hydrogen and 30 mol percent of $C_1$ to $C_4$ paraffins. Other suitable gases are steam cracker tail gas, catalytic cracker tail gas and tail gas derived from the dehydrogenation of hydrocarbons.

Preferably the severity of the conditions of hydrogenation is selected to provide a high percentage conversion of any di-olefins present to mono-olefins and of any styrenes present to saturated hydrocarbons. As is well known in the art, severity of hydrogenation can be increased by raising the hydrogen partial pressure, raising the reaction temperature, increasing the hydrogen/feedstock ratio or decreasing the flow rate.

The hydrogen consumption per unit weight of feed stock is a measure of the degree of saturation of the di-olefins and styrenes, and hence the degree of improvement in the gum stability of the gasoline. Preferably the hydrogen consumption is at least 60 s.c.f./b., and more particularly at least 120 s.c.f./b., and it may be more than 150 s.c.f./b. The upper limit of hydrogen consumption will be determined by the undesirability of substantially reducing the octane number of the gasoline by hydrogenation of mono-olefins. Preferably the research octane number (with 1.5 me. TEL/IG) of the gasoline product is not less than the research octane number of the similarly leaded feedstock. Leaded research octane numbers are preferred as a basis for comparison since while there may be some slight drop in research octane numbers (clear) as between feed and product, this is offset by an increased lead response in the product.

Suitable hydrogenation conditions may be:

| | |
|---|---|
| Temperature | 0 to 200° C. (preferably 80 to 180° C.). |
| Pressure | 0 to 1000 p.s.i.g. (preferably 200–300 p.s.i.g.). |
| Gas recycle rate (recycle or once through) | 300 to 1000 s.c.f./b. of hydrogen. |
| Space velocity | 0.5 to 10 v./v.hr. (preferably about 2 v./v./hr.). |

The treated gasoline may be stabilised to give a product of low $C_4$ content and may also be re-run to remove a small proportion of heavy ends. Re-running at a maximum temperature of not more than 400° F. may be advisable, since high re-running temperatures can adversely affect gum stability.

Suitable tests which give a measure of the gum stability of gasolines during storage or in an engine are the Induction Period test (ASTM Method D525–55), the Accelerated Gum Test (D873–49), and the Existent Gum (ASTM Method D381–57).

The invention is illustrated by the following examples:

EXAMPLE 1

*Preparation of catalyst as in method (a) described above*

180 g. of 6–10 BSS mesh sepiolite were impregnated with a solution of 77.5 g. analar nickel nitrate

$Ni(NO_3)_2 \cdot 6H_2O$ dissolved in 200 ml. distilled water. All the solution was absorbed. The material was dried at 100° C. for 1 hr. and then roasted at 550° C. for 2 hrs. in air to give a catalyst of nickel oxide on sepiolite.

EXAMPLE 2

*Preparation of catalyst as in method (b) described above*

400 g. of 30–60 BSS mesh sepiolite was ball milled in the dry state with 122 g. of nickel formate for 3 hrs. The resulting nickel formate-sepiolite mixture was then pelleted to ⅛″ x ⅛″ pellets.

EXAMPLE 3

*Preparation of catalyst as in method (c) described above*

200 ml. (87 g.) of sepiolite, crushed to 6–10 mesh and roasted for 2 hrs. at 550° C. were impregnated with a solution of 29 g. nickel formate, $Ni(HCO_2)_2 \cdot 2H_2O$, in 80 ml. ammonia solution (S.G. 880) and 20 ml. distilled water. All the solution was absorbed. The catalyst was dried in a current of air at 100° C. for 3 hrs. The nominal nickel content was 9.6% wt.

EXAMPLE 4

The catalyst prepared in Example 3 was activated by heating for 4 hours in an inert gas stream at 250° C., and then tested for hydrogenation activity using a steam cracker gasoline as feedstock. Inspection data on the feedstock are given in Table 1 below:

TABLE 1

| | | |
|---|---|---|
| Specific gravity at 60° F./60° F. | | 0.7825 |
| ASTM distillation: | | |
| IBP | ° C. | 45.0 |
| 2% volume recovered at | ° C. | 57.5 |
| 5% volume recovered at | ° C. | 63.0 |
| 10% volume recovered at | ° C. | 67.5 |
| 20% volume recovered at | ° C. | 76.0 |
| 30% volume recovered at | ° C. | 85.0 |
| 40% volume recovered at | ° C. | 94.5 |
| 50% volume recovered at | ° C. | 103.5 |
| 60% volume recovered at | ° C. | 113.0 |
| 70% volume recovered at | ° C. | 122.0 |
| 80% volume recovered at | ° C. | 133.0 |
| 90% volume recovered at | ° C. | 155.0 |
| FBP | ° C. | 218 |
| Recovery | percent vol. | 98.0 |
| Residue | do. | 1.1 |
| Loss | do. | 0.9 |
| Recovered at 70° C. | do. | 12.5 |
| Recovered at 10° C. | do. | 46.0 |
| Recovered at 140° C. | do. | 83.5 |
| Gum existent | mg./100 ml. | 8 |
| Gum accelerated (120 min.) | mg./100 ml. | 8 |
| Gum accelerated (240 min.) | mg./100 ml. | 227 |
| Induction period ASTM | min. | 290 |
| Induction period IP | min. | 225 |
| Bromine number | | 65.8 |
| Sulphur | percent wt. | 0.005 |
| Research octane number clear | | 93.8 |

Pure hydrogen gas was used on a once through basis. Other process conditions and inspection data on the product are given in Table 2 which also includes, for purposes of comparison, data on the treatment of the feedstock with a catalyst of nickel on alumina.

TABLE 2

| Catalyst | Nickel on alumina | Nickel on sepiolite |
|---|---|---|
| Time on stream hr. | 8–14 HOS | 8–14 HOS |
| Temperature ° C. | 99.4 | 100.6 |
| Pressure p.s.i.g. | 201 | 202 |
| Space velocity v./v./hr. | 2 | 2 |
| Hydrogen absorption in s.c.f./b. | 120 | 220 |
| Catalyst bulk densities g./ml. | 1.1 | 0.78 |

It will be seen from the table that the nickel-on-sepiolite catalyst had a greater activity for hydrogenation (as shown by the hydrogen absorption figures) than the nickel on alumina catalyst. The nickel-on-sepiolite catalyst also has a lower bulk density than the nickel-on-alumina catalyst so that on a weight basis the difference would be even more marked.

EXAMPLE 5

Powdered sepiolite, of 30–60 mesh grain size was calcined for 2 hours at 550° C., and mixed with 1 percent weight powdered graphite to give an even graphite distribution. The mixture was then pelleted to ⅛″ x ⅛″ cylinders. The sepiolite pellets were contacted with a solution of the complex $Ni(NH_3)_6(HCOO)_2$ such that the resultant nominal nickel content of the impregnated pellets was 10 percent weight. All the solution was absorbed by the sepiolite pellets which were then air dried at 100° C. The catalyst had a bulk density of 1.05 g./ml.

EXAMPLE 6

The catalyst of Example 5 was activated by heating for 2 hours at atmospheric pressure and 250° C. in a stream of hydrogen. The hydrogen flow rate was 100 v./v./hr. It was then tested for hydrogenation activity using a steam cracker gasoline as feedstock. Inspection data on the feedstock are given in Table 3 overleaf.

TABLE 3.—INSPECTION DATA ON STEAM CRACKER GASOLINE FEEDSTOCK

| | | |
|---|---|---:|
| Specific gravity at 60° F./60° F | | 0.7800 |
| ASTM distillation test: | | |
| IBP | ° C | 44.5 |
| 2% recovered at | ° C | 53.5 |
| 5% recovered at | ° C | 60.5 |
| 10% recovered at | ° C | 66.5 |
| 20% recovered at | ° C | 76.0 |
| 30% recovered at | ° C | 85.0 |
| 40% recovered at | ° C | 95.0 |
| 50% recovered at | ° C | 105.0 |
| 60% recovered at | ° C | 113.5 |
| 70% recovered at | ° C | 122.5 |
| 80% recovered at | ° C | 135.0 |
| 90% recovered at | ° C | 158.5 |
| FBP | ° C | 214.0 |
| Recovery | percent vol | 97.5 |
| Residue | do | 1.3 |
| Loss | do | 1.2 |
| Recovered at 70° C | do | 13.5 |
| Recovered at 100°C | do | 45.0 |
| Recovered at 140° C | do | 82.5 |
| Total sulphur | percent weight | 0.007 |
| Gum existent | mg./100 ml | *(22)4 |
| Gum accelerated (120 minute), mg./100 ml | | *(28)25 |
| Gum accelerated (240 minute), mg./100 ml | | *(137)113 |
| Induction period ASTM | min | 315 |
| Induction period IP | min | 235 |
| Bromine number | | 70.0 |
| Diene index | | 4.44 |

* Figures in parentheses indicate gum content before washing with n-heptane.

The hydrogenation was carried out for a 6 hour period under the following conditions:

Temperature _____ 100° C.
Pressure _____ 200 p.s.i.g.
Space velocity _____ 2 v./v./hr.
Gas flow rate _____ 32 l./hr. at STP (750 s.c.f./b.).

The hydrogen absorption, a measure of the catalyst activity, was 210 s.c.f./b. Inspection data on the product were as follows:

| | |
|---|---:|
| Specific gravity | 0.7785 |
| Gum existent _____ Mg./100 Ml | *1 |
| Gum accelerated (120 minute) __ Mg./100 Ml | *1 |
| Induction period (ASTM) _____ min | 720 |
| Bromine number | 42.7 |

* After washing with n-heptane.

These figures show the considerable improvement in existent and accelerated gum figures and in the induction period resulting from the hydrogenation.

I claim:
1. A catalyst comprising a member of the group consisting of nickel and nickel compounds supported on a base consisting essentially of sepiolite.
2. A catalyst as claimed in claim 1 having a nickel content, expressed as elemental nickel of from 1 to 50%, by weight of total catalyst.
3. A catalyst as claimed in claim 2 having a nickel content, expressed as elemental nickel, of from 5 to 15% by weight of total catalyst.
4. A process for the hydrogenation of organic compounds comprising contacting the compounds together with a catalyst comprising nickel supported on a base consisting essentially of sepiolite.
5. A process as claimed in claim 4 wherein the compounds are derived from petroleum.
6. A process as claimed in claim 5 which is a process for improving the gum-forming tendency of gasolines containing at least one compound selected from the class consisting of di-olefins and styrenes.
7. A process as claimed in claim 5 wherein the gasoline is a steam cracker gasoline.
8. A process as claimed in claim 6 wherein the research octane number (with 1.5 ml. TEL/IG) of the product is not less than the research octane number (with 1.5 ml. TEL/IG) of the feedstock.
9. A process as claimed in claim 6 wherein the temperature is 0–200° C. and the pressure is 0–1000 p.s.i.g.
10. A process as claimed in claim 9 wherein the temperature is 80–180° C. and the pressure is 200–300 p.s.i.g.
11. A process as claimed in claim 9 wherein the gas rate is 300–1000 s.c.f./b. and the space velocity is 0.5–10 v./v./hr.

References Cited in the file of this patent

UNITED STATES PATENTS

| | | |
|---|---|---|
| 2,042,298 | Davis | May 28, 1936 |
| 2,073,578 | Guynn | Mar. 9, 1937 |
| 2,116,061 | Dorrer | May 3, 1938 |
| 2,542,471 | Brandon | Feb. 20, 1951 |
| 2,638,438 | Hoffman et al. | May 12, 1953 |
| 2,735,879 | Redcay | Feb. 21, 1956 |
| 2,865,851 | Porter | Dec. 23, 1958 |
| 2,901,423 | Herbert et al. | Aug. 25, 1959 |

UNITED STATES PATENT OFFICE
CERTIFICATE OF CORRECTION

Patent No. 3,004,914                 October 17, 1961

Peter Thomas White

It is hereby certified that error appears in the above numbered patent requiring correction and that the said Letters Patent should read as corrected below.

Column 1, line 13, for "consists" read -- consist --; column 2, lines 56 and 57, for "possible" read -- possibly --; column 4, line 34, for "10° C" read -- 100° C --; line 37, for "8" read -- 46 --.

Signed and sealed this 10th day of April 1962.

(SEAL)
Attest:

ERNEST W. SWIDER

Attesting Officer

DAVID L. LADD
Commissioner of Patents